(12) United States Patent
Misaizu

(10) Patent No.: US 11,665,289 B2
(45) Date of Patent: May 30, 2023

(54) REGISTERING AN IMAGE BASED ON PRINTING DATA AND READ DATA USING A POSITION CORRECTION AMOUNT CALCULATED FOR A PRINTED IMAGE IN A CASE WHERE THE CORRESPONDING IMAGE HAS A PERIODIC STRUCTURAL FEATURE OR NO STRUCTURAL FEATURE

(71) Applicant: FUJIFILM Business Innovation Corp., Tokyo (JP)

(72) Inventor: Toru Misaizu, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/745,828

(22) Filed: May 16, 2022

(65) Prior Publication Data

US 2023/0124195 A1 Apr. 20, 2023

(30) Foreign Application Priority Data

Oct. 15, 2021 (JP) .............................. JP2021-169930

(51) Int. Cl.
*H04N 1/00* (2006.01)

(52) U.S. Cl.
CPC ..... *H04N 1/00047* (2013.01); *H04N 1/00005* (2013.01); *H04N 1/00015* (2013.01); *H04N 1/00082* (2013.01)

(58) Field of Classification Search
CPC .......................... H04N 1/00002–00092; H04N 1/00763–00782; H04N 1/0066; H04N 1/00702; H04N 1/00718; H04N 1/00758; H04N 1/00761; H04N 1/3872; H04N 1/3873; H04N 1/3877; H04N 1/3878; G06K 15/027; G06K 15/1842; G06K 15/1868

See application file for complete search history.

(56) References Cited

U.S. PATENT DOCUMENTS 8,433,209 B2* 4/2013 Ito ...................... G03G 15/5016
358/1.14

FOREIGN PATENT DOCUMENTS

| JP | 2004195878 | A | * | 7/2004 | | |
|---|---|---|---|---|---|---|
| JP | 2012232510 | | | 11/2012 | | |
| JP | 2013036815 | A | * | 2/2013 | | |
| JP | 2015059744 | A | * | 3/2015 | ............ | G06T 7/001 |
| JP | 2022011816 | A | * | 1/2022 | ........... | G06F 3/1208 |
| JP | 2022123634 | A | * | 8/2022 | | |

* cited by examiner

*Primary Examiner* — Scott A Rogers
(74) *Attorney, Agent, or Firm* — JCIPRNET

(57) ABSTRACT

An image inspection apparatus includes a processor configured to acquire printing data that is data as a base of an image to be printed, acquire read data that is data obtained by reading the image printed on a paper sheet, specify whether or not the printing data or the read data is an image corresponding to any of an image having a periodic structural feature or an image not having a structural feature, in a case where the printing data or the read data corresponds to the image having the periodic structural feature or the image not having the structural feature, perform registration using a position correction amount that is a correction amount for registering an image based on the printing data and an image based on the read data and is calculated for an already printed image, and inspect the image by comparing the printing data with the read data.

10 Claims, 8 Drawing Sheets

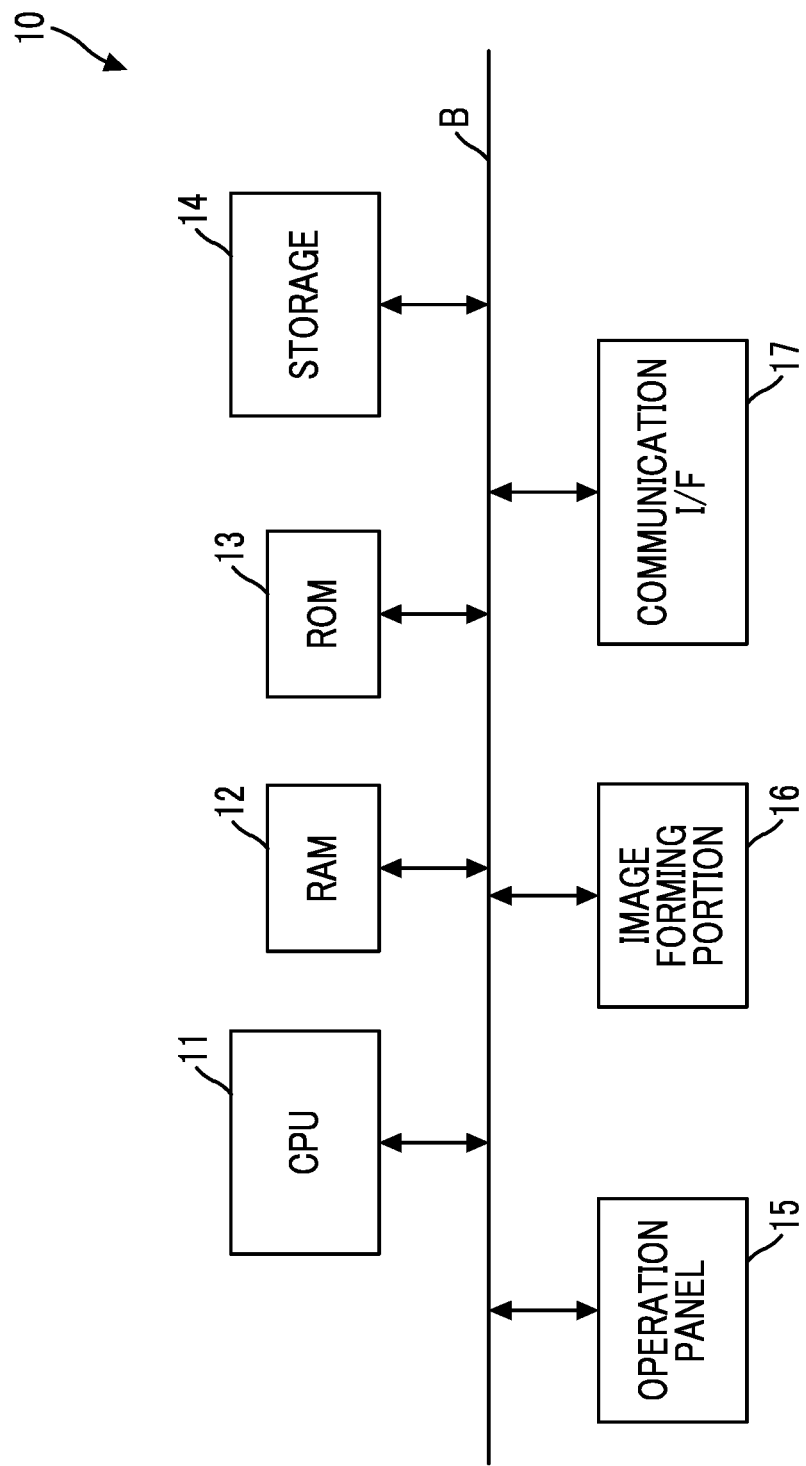

REGISTERING AN IMAGE BASED ON PRINTING DATA AND READ DATA USING A POSITION CORRECTION AMOUNT CALCULATED FOR A PRINTED IMAGE IN A CASE WHERE THE CORRESPONDING IMAGE HAS A PERIODIC STRUCTURAL FEATURE OR NO STRUCTURAL FEATURE

CROSS-REFERENCE TO RELATED APPLICATIONS

This application is based on and claims priority under 35 USC 119 from Japanese Patent Application No. 2021-169930 filed Oct. 15, 2021.

BACKGROUND

(i) Technical Field

The present invention relates to an image inspection apparatus, an image inspection system, and a non-transitory computer readable medium storing a program.

(ii) Related Art

In the related art, an image inspection apparatus that inspects a printed image by comparing printing data as a base of an image to be printed with read data obtained by reading the printed image has been used. At this point, a mark for performing registration is added to the image, and the registration is performed between the image based on the printing data and the image based on the read data.

JP2012-232510A discloses a quality inspection system that processes registration by printing an image pattern having low visual sensitivity on a printed image of a quality inspection target from which a feature point cannot be extracted.

SUMMARY

The mark for performing the registration may not be added depending on a type and the like of a paper sheet. At this point, in a case of performing the registration based on the image without using the mark, the registration may be difficult for an image having a periodic structural feature such as a repeating vertical pattern or an image not having a structural feature, such as a full halftone.

Aspects of non-limiting embodiments of the present disclosure relate to an image inspection apparatus, an image inspection system, and a non-transitory computer readable medium storing a program that can perform registration even for an image having a periodic structural feature or an image not having a structural feature in a case of inspecting a printed image by comparing printing data as a base of the printed image with read data obtained by reading the printed image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image inspection apparatus including a processor configured to acquire printing data that is data as a base of an image to be printed, acquire read data that is data obtained by reading the image printed on a paper sheet, specify whether or not the printing data or the read data is an image corresponding to any of an image having a periodic structural feature or an image not having a structural feature, in a case where the printing data or the read data corresponds to the image having the periodic structural feature or the image not having the structural feature, perform registration using a position correction amount that is a correction amount for registering an image based on the printing data and an image based on the read data and is calculated for an already printed image, and inspect the image by comparing the printing data with the read data.

BRIEF DESCRIPTION OF THE DRAWINGS

Exemplary embodiment(s) of the present invention will be described in detail based on the following figures, wherein:

FIG. 2 is a diagram illustrating a hardware configuration example of a printing apparatus;

DETAILED DESCRIPTION

Hereinafter, an exemplary embodiment of the present invention will be described in detail with reference to the accompanying drawings.

Overall Description of Image Inspection System

Figure 1:
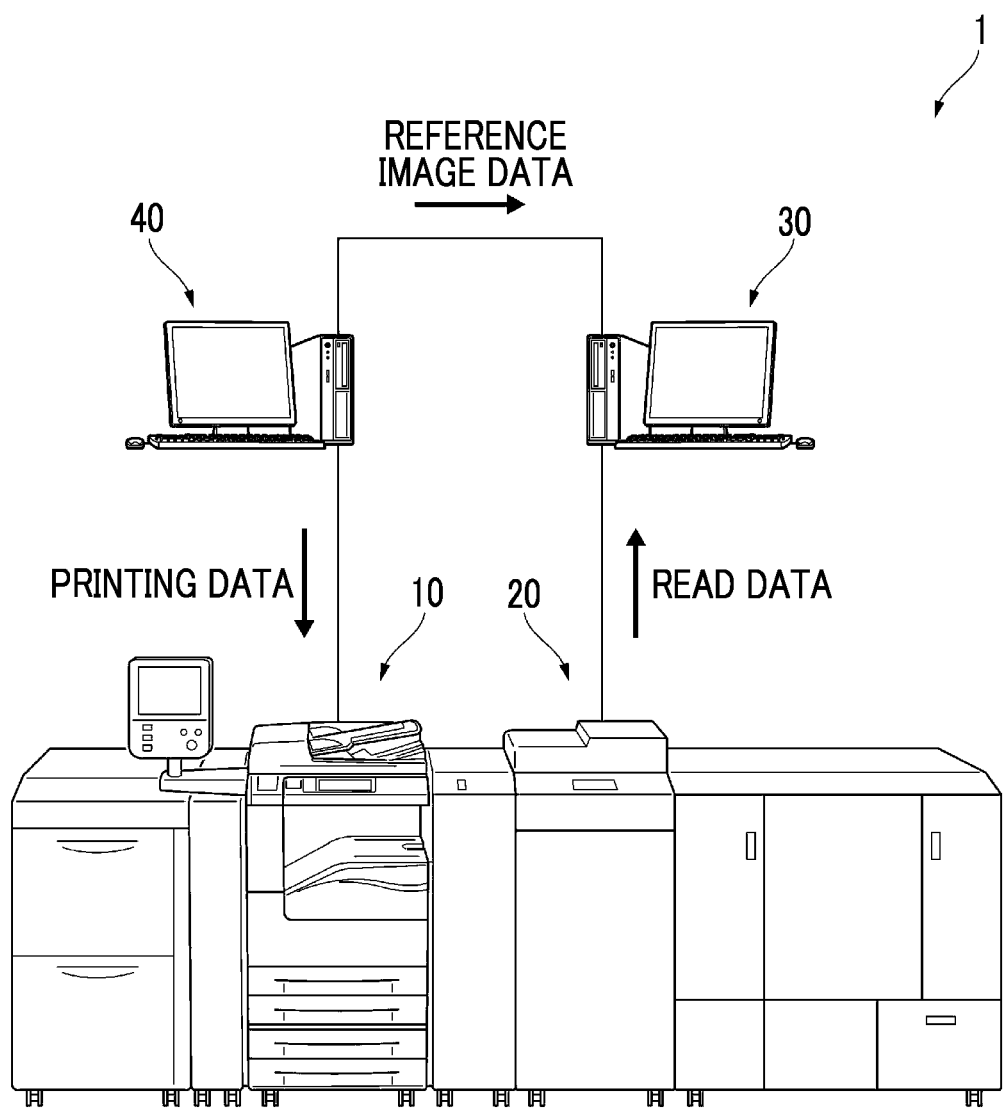
FIG. 1 is a diagram illustrating a configuration example of an image inspection system in an exemplary embodiment.

FIG. 1 is a diagram illustrating a configuration example of an image inspection system 1 in the present exemplary embodiment.

As illustrated, the image inspection system 1 of the present exemplary embodiment includes a printing apparatus 10 that prints an image, a reading apparatus 20 that reads the printed image, an image inspection apparatus 30 that inspects the image, and an information processing apparatus 40 that creates printing data or color data for inspection.

The printing apparatus 10 is an apparatus that has a printer function of printing the image on a paper sheet which is a recording medium, and outputting the printed image as a printed document.

FIG. 2 is a diagram illustrating a hardware configuration example of the printing apparatus 10.

As illustrated, the printing apparatus 10 includes a CPU 11, a random access memory (RAM) 12, a read only memory (ROM) 13, a storage 14, an operation panel 15, an image forming portion 16, and a communication I/F 17. These components exchange necessary data via a bus B.

The CPU 11 implements each function, described later, by loading various programs stored in the ROM 13 or the like into the RAM 12 and executing the loaded various programs.

The RAM 12 is a memory used as a work memory or the like of the CPU 11.

The ROM 13 is a memory storing the various programs and the like executed by the CPU 11.

The storage 14 is a hard disk drive (HDD) or a solid state drive (SSD) and stores image information and the like used in the image forming portion 16.

The operation panel 15 is, for example, a touch panel that displays various information and receives an operation input from a user. In a case where the operation panel 15 is a touch panel, the operation panel 15 includes a display portion such as a liquid crystal panel that displays a content (information content) as an image in a predetermined region. In addition, the operation panel 15 has a function of sensing a position of contact of a contact object on the liquid crystal panel when the contact object represented by a finger of a person or a stylus pen comes into contact with the liquid crystal panel. In the present exemplary embodiment, the touch panel is not particularly limited, and touch panels of various types such as a resistive film type and an electrostatic capacitive type can be used.

The image forming portion 16 is an example of a printing mechanism that forms an image on a paper sheet. Here, the image forming portion 16 of an electrophotographic type that forms an image by transferring toner attached to a photoconductor to a paper sheet, or an ink jet type that forms an image by ejecting ink onto a paper sheet can be used.

The communication I/F 17 transmits and receives various information to and from other apparatuses.

The reading apparatus 20 reads the image printed on the paper sheet by the printing apparatus 10. The reading apparatus 20 is a so-called inline sensor and reads the image printed on the paper sheet that is being transported.

Figure 3A:
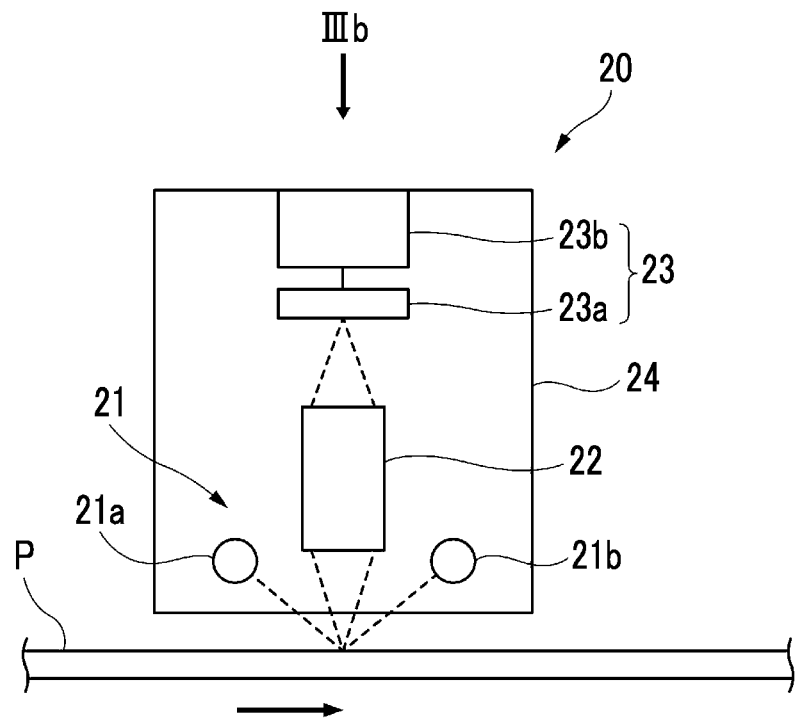
FIGS. 3A and 3B are diagrams for describing a reading apparatus.
Figure 3B:
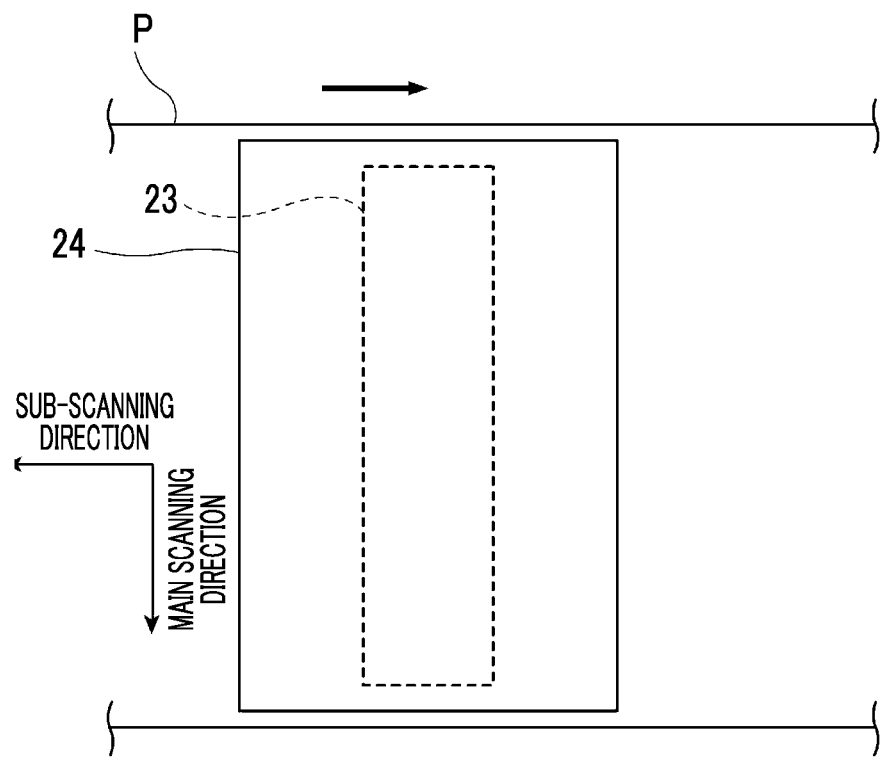

FIGS. 3A and 3B are diagrams for describing the reading apparatus 20. Here, FIG. 3A is a diagram when the reading apparatus 20 is seen from the same direction as FIG. 1. In addition, FIG. 3B is a diagram when the reading apparatus 20 is seen from a direction IIIb in FIG. 3A.

As illustrated, the reading apparatus 20 includes a light source 21, an optical system 22, a charge coupled device (CCD) sensor 23, and a housing 24.

The light source 21 irradiates a paper sheet P on which the image is formed, with light. For example, the light source 21 is configured with a pair of tungsten lamps 21a and 21b. Reflected light including information about the image is generated by irradiating the image formed on the paper sheet P with light.

The optical system 22 guides the light reflected by the image formed on the paper sheet P to the CCD sensor 23. In the present exemplary embodiment, the optical system 22 consists of a SELFOC lens array (SLA: registered trademark) that is a lens array. This SELFOC lens array generally condenses diffuse reflected light out of the reflected light from the image and forms an image of the condensed diffuse reflected light on the CCD sensor 23.

The CCD sensor 23 receives the light guided by the optical system 22. CCDs 23a as pixels receiving the light reflected by the image are arranged in a line in the CCD sensor 23. In the present exemplary embodiment, CCDs corresponding to colors of red (R), green (G), and blue (B), respectively, are arranged in three arrays, and the image can be measured with each color of RGB. That is, the CCDs 23a are 3-line color CCDs. The CCDs 23a are arranged in a main scanning direction for each color of RGB. That is, accordingly, the image can be read in the main scanning direction. In addition, the paper sheet moves in a sub-scanning direction in accordance with the transport of the paper sheet. Accordingly, the image can be read in the sub-scanning direction. The light received by the CCDs 23a is photoelectrically converted into charges, and these charges are transferred to a read data generation portion 23b.

In the read data generation portion 23b, the charges transferred from the CCDs 23a are sensed as a sensing signal. This sensing signal is read data obtained by reading the image formed on the paper sheet. Since the CCDs 23a are color CCDs of three colors of R, G, and B, an R signal, a G signal, and a B signal are generated as read data corresponding to each color in the read data generation portion 23b.

The housing 24 is a case for accommodating the light source 21, the optical system 22, and the CCD sensor 23.

The image inspection apparatus 30 inspects the image read by the reading apparatus 20. The image inspection apparatus 30 acquires the printing data that is data as a base of the image to be printed, from the information processing apparatus 40. In addition, the image inspection apparatus 30 acquires the read data from the read data generation portion 23b of the reading apparatus 20. The image is inspected by comparing the printing data with the read data. This matter will be described in detail later.

The information processing apparatus 40 creates the printing data. This matter will also be described in detail later.

The image inspection apparatus 30 and the information processing apparatus 40 are computer apparatuses. The image inspection apparatus 30 and the information processing apparatus 40 each perform processing by operating various application software under management of an operating system (OS). The image inspection apparatus 30 and the information processing apparatus 40 include a central processing unit (CPU) that is calculation means, a main memory that is storage means, and a storage such as an HDD or an SSD. Here, the CPU executes various programs such as the OS and application software. In addition, the main memory is a storage region storing the various programs, data used for executing the various programs, and the like. The storage is a storage region storing input data for the various programs, output data from the various programs, and the like. Furthermore, the image inspection apparatus 30 and the information processing apparatus 40 include a communication interface for external communication. Here, the CPU is an example of a processor.

Figure 4:
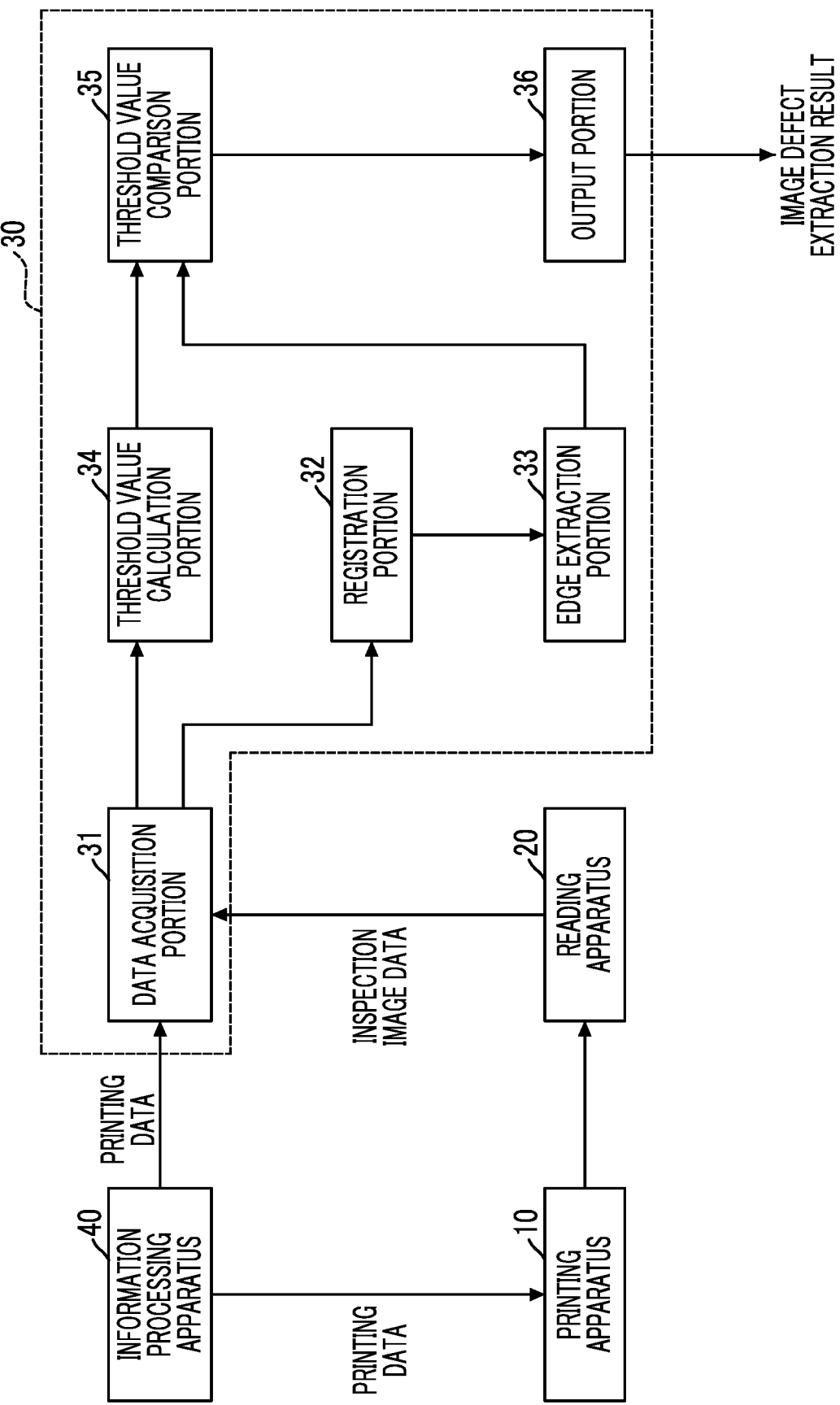
FIG. 4 is a diagram illustrating a processing flow performed in the image inspection system.

FIG. 4 is a diagram illustrating a processing flow performed in the image inspection system 1.

As illustrated, in the image inspection system 1, the information processing apparatus 40 creates the printing data for printing by the printing apparatus 10. This printing data is raster image processor (RIP) data and is color data based on color of a coloring material such as toner used in the printing apparatus 10. In the present exemplary embodiment, cyan (C), magenta (M), yellow (Y), and black (K) are used as the color of the coloring material.

In the printing apparatus 10, printing is performed on the paper sheet based on the printing data.

The printed paper sheet is transported, and the reading apparatus 20 reads the printed image. The read data read by the reading apparatus 20 is transmitted to the image inspection apparatus 30 as inspection image data.

In the image inspection apparatus 30, a data acquisition portion 31 acquires the printing data that is created by the information processing apparatus 40 and is data as the base of the image to be printed. In addition, the data acquisition portion 31 acquires the inspection image data as the read data that is transmitted from the reading apparatus 20 and is data obtained by reading the image printed on the paper sheet. In addition, at this point, a registration portion 32 performs registration between the image based on the printing data and the image based on the inspection image data. An edge extraction portion 33 extracts an image part by performing edge extraction on the inspection image data. A difference between the printing data and the inspection image data is calculated. In addition, a threshold value calculation portion 34 calculates a threshold value for determining an image defect based on the printing data. This threshold value is used for determining that the image defect is not present in a case where the difference between the printing data and the inspection image data is less than or equal to the threshold value, and determining that the image defect is present in a case where the difference exceeds the threshold value. A threshold value comparison portion 35 compares the difference between the printing data and the inspection image data with the threshold value, and an output portion 36 outputs an image defect extraction result. Accordingly, whether or not the image defect is present in the image printed by the printing apparatus 10 can be detected. For example, this image defect is present in a case where dust is attached to the paper sheet, or a case where a dot, a streak, or the like that is originally not present occurs in the image. That is, in the image inspection apparatus 30, the image is inspected by comparing the printing data with the inspection image data.

At this point, the inspection image data that is the read data transmitted from the reading apparatus 20 is RGB data. In addition, the printing data transmitted from the information processing apparatus 40 is converted into RGB data by an RGB conversion portion 49, described later, in FIG. 5. In the image inspection apparatus 30, the image is inspected by comparing the printing data with the inspection image data in the same color space of an RGB color space. The inspection image data transmitted from the reading apparatus 20 may be converted from RGB data into L*a*b* data in the image inspection apparatus 30. In this case, in the information processing apparatus 40, the conversion is performed into L*a*b* data instead of RGB data. Furthermore, in the image inspection apparatus 30, the printing data is acquired as L*a*b* data. In the image inspection apparatus 30, the image is inspected by comparing the printing data with the inspection image data in the same color space of an L*a*b* color space.

Description of Information Processing Apparatus 40

Next, processing performed in the information processing apparatus 40 will be described in detail.

Figure 5:
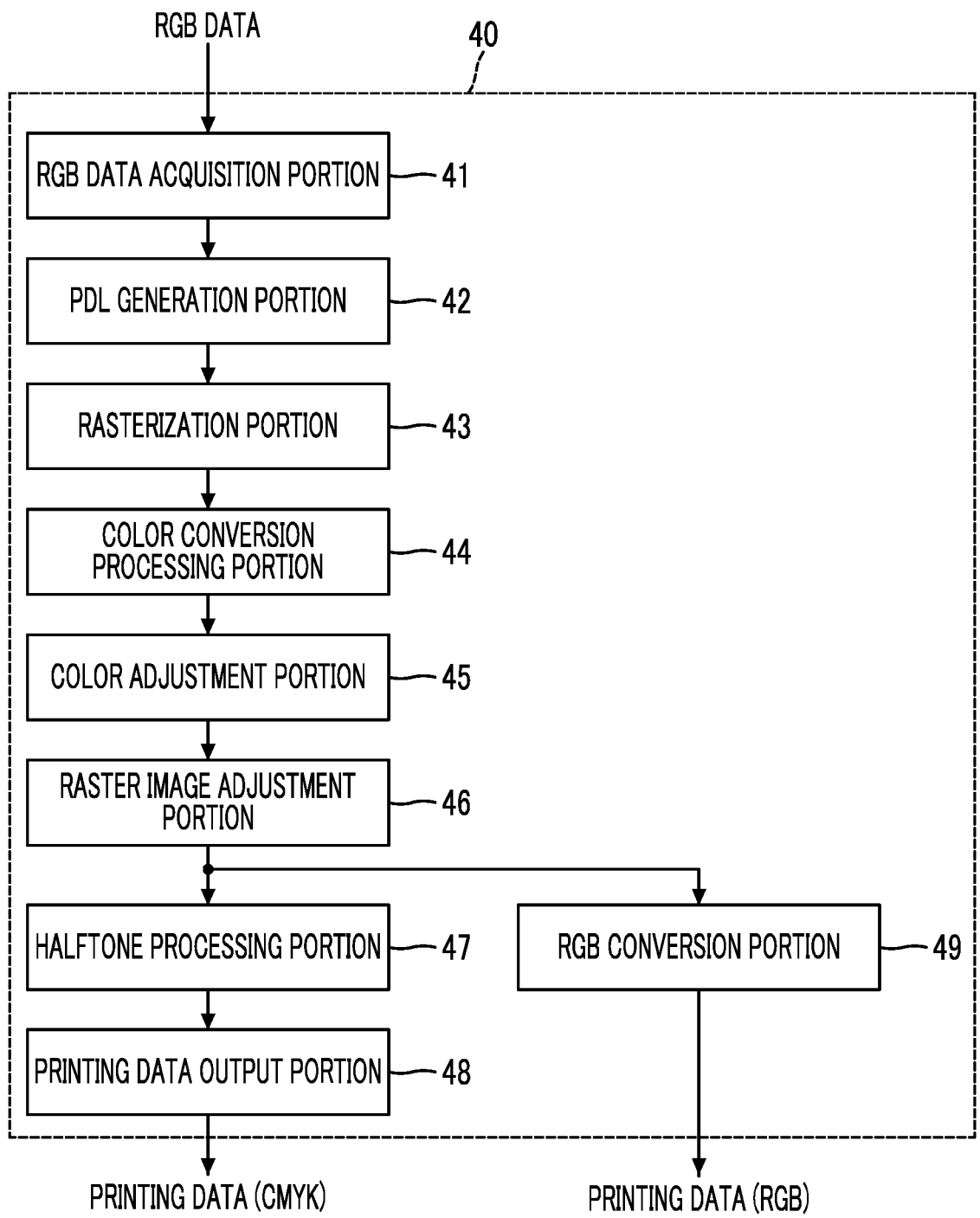
FIG. 5 is a block diagram illustrating a signal processing system in an information processing apparatus.

FIG. 5 is a block diagram illustrating a signal processing system in the information processing apparatus 40.

The information processing apparatus 40 includes an RGB data acquisition portion 41 that acquires RGB data created for outputting the image by the printing apparatus 10, a PDL generation portion 42 that receives red, green, and blue (RGB) data and converts the RGB data into a page description language (PDL), a rasterization portion 43 that creates a raster image from the PDL generated by the PDL generation portion 42, a color conversion processing portion 44 that converts the RGB data into CMYK data, a color adjustment portion 45 that adjusts color of the CMYK data, a raster image adjustment portion 46 that adjusts the raster image converted by the color adjustment portion 45, a halftone processing portion 47 that performs halftone processing, a printing data output portion 48 that outputs the printing data after signal processing to the printing apparatus 10, and the RGB conversion portion 49 that converts the CMYK data into RGB data.

In the present exemplary embodiment, first, the RGB data acquisition portion 41 receives RGB data from an external PC. This RGB data is image data that a user using the PC intends to print by the printing apparatus 10.

The RGB data is transmitted to the PDL generation portion 42. The PDL generation portion 42 converts the RGB data into code data described in PDL and outputs the code data.

The rasterization portion 43 converts the code data that is output from the PDL generation portion 42 and is described in PDL, into raster data for each pixel as a raster image.

The color conversion processing portion 44 converts the raster data input from the rasterization portion 43 into CMYK data that is reproduction color (CMYK is color of toner which is a coloring material) of the printing apparatus 10, and outputs the CMYK data. This CMYK data consists of C color data, M color data, Y color data, and K color data separated for each color.

The color adjustment portion 45 functions as color adjustment means for adjusting color of the image to be formed by the printing apparatus 10. The color adjustment portion 45 adjusts the color of the CMYK data to target color that is to be originally output by the printing apparatus 10.

The raster image adjustment portion 46 performs various adjustments for obtaining more favorable image quality by the printing apparatus 10, by performing y conversion, definition processing, middle tone processing, or the like on the CMYK data output from the color adjustment portion 45.

The halftone processing portion 47 performs halftone processing on the printing data by performing dither mask processing using a dither mask having predetermined threshold value arrays in the main scanning direction and the sub-scanning direction. Accordingly, for example, the printing data is changed from printing data represented by multiple values to printing data represented by two values.

The printing data output portion 48 outputs the printing data created by the halftone processing portion 47 to the printing apparatus 10. This printing data is CMYK data.

The RGB conversion portion 49 converts the CMYK data output from the raster image adjustment portion 46 into RGB data again. The printing data changed to the RGB data is output to the image inspection apparatus 30.

Description of Registration Portion 32

Next, a method of performing the registration between the image based on the printing data and the image based on the inspection image data by the registration portion 32 of the image inspection apparatus 30 will be described in detail.

In the registration portion 32, whether or not the printing data or the inspection image data is an image corresponding to any of an image having a periodic structural feature or an image not having a structural feature is specified. Here, the "structural feature" is a feature of an image decided by pixel values of pixels forming the image.

In a case where the printing data or the inspection image data does not correspond to the image, the registration portion 32 performs the registration using a position correction amount that is a correction amount for registering the image based on the printing data and the image based on the inspection image data. On the other hand, in a case where the printing data or the inspection image data corresponds to the image, the registration portion 32 performs the registration using a position correction amount calculated for the already printed image. For example, the already printed image is an image printed earlier by one page.

For example, the registration between both images is performed by template matching.

Figure 6:
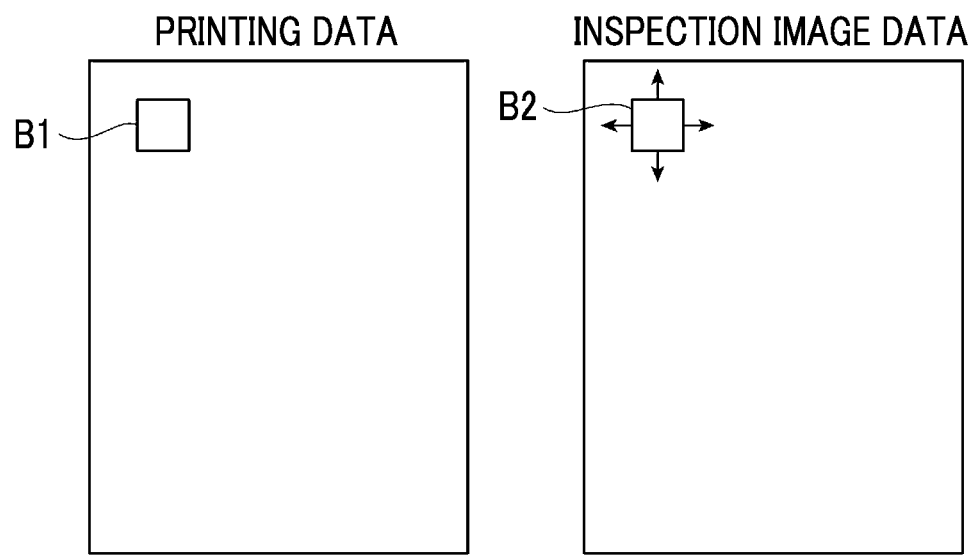
FIG. 6 is a diagram illustrating template matching.

FIG. 6 is a diagram illustrating the template matching.

In FIG. 6, a block B set for performing the template matching is illustrated. Here, a block B1 is set for the image based on the printing data as the block B. In addition, a block B2 is set for the image based on the inspection image data at a position corresponding to the block B1. In actuality, for example, 40 blocks B are set for each image, and the template matching is performed for each image.

Pixel values in the block B1 and the block B2 are compared by moving any one of the block B1 or the block B2. Here, for example, the pixel value of each pixel in the block B1 is denoted by ($L_1^*$, $a_1^*$, $b_1^*$). In addition, the pixel value of each pixel in the block B2 at the corresponding position is denoted by ($L_2^*$, $a_2^*$, $b_2^*$). Since the printing data is CMYK data, and the inspection image data is RGB data, each of the printing data and the inspection image data is converted into $L^*a^*b_1^*$ data.

The registration portion 32 uses a value of $(L_2^*-L_1^*)^2 + (a_2^*-a_1^*)^2 + (b_2^*-b_1^*)^2$ for each pixel and calculates a difference e defined by Equation (1) below as a value obtained by calculating a total of the value for all pixels of the block B1 and the block B2.

$$e=\Sigma\{(L_2^*-L_1^*)^2+(a_2^*-a_1^*)^2+(b_2^*-b_1^*)^2\} \qquad (1)$$

The registration portion 32 obtains a time when the difference e is the minimum by translating the block B2 in left-right and up-down directions in the image. The minimum value of the difference e is used as the minimum color difference value.

In addition, the registration portion 32 obtains a movement amount when the difference e is the minimum. A translation amount when the difference e is the minimum can be considered to be a misregistration amount between the printing data and the inspection image data in this location. In addition, this misregistration amount is considered to be the position correction amount that is a value for correcting the position. The movement amount of the image in the left-right direction (main scanning direction) is denoted by $\Delta x$, and the translation amount of the image in the up-down direction (sub-scanning direction) is denoted by $\Delta y$. In a case where a pixel positioned at (x, y) in the block B1 corresponds to a pixel positioned at (u, v) in the block B2, $\Delta x$ and $\Delta y$ can be represented as $\Delta x=x-u$ and $\Delta y=y-v$. Here, while the block B2 is translated, the block B1 may be translated instead.

In such a manner, in the present exemplary embodiment, the registration portion 32 extracts a feature amount from the printing data and/or the inspection image data and performs the registration using this feature amount. In this case, the feature amount is a matching degree when the printing data and the inspection image data are relatively translated. The "matching degree" is a parameter representing a degree of identicalness of the images and is, for example, the difference e. In addition, the feature amount can be said to be a pixel value or chromaticity between the images.

However, in a case where the image based on the printing data or the image based on the inspection image data is the image having the periodic structural feature, the registration portion 32 may not be able to calculate the position correction amount.

Figure 7A:
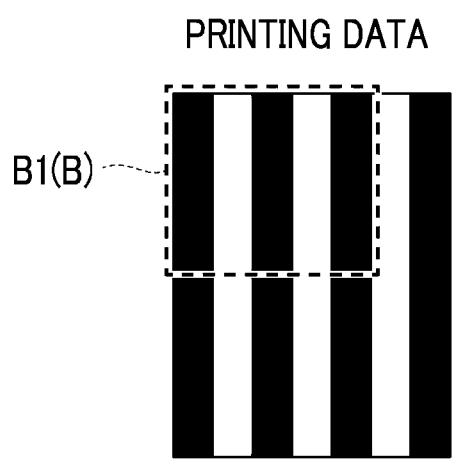
FIGS. 7A and 7B are diagrams illustrating an example of a case where periodicity is present in an image.
Figure 7B:
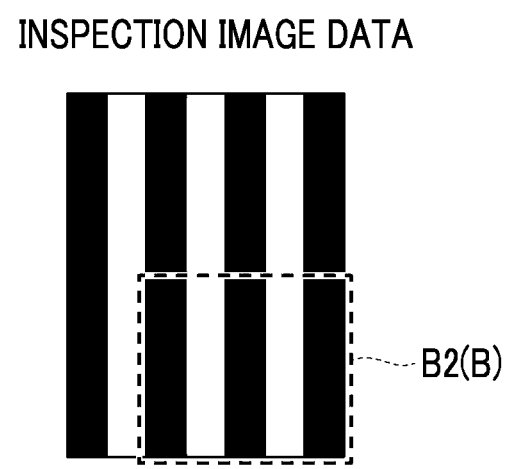

FIGS. 7A and 7B are diagrams illustrating a case where the image based on the printing data or the image based on the inspection image data is the image having the periodic structural feature.

FIG. 7A illustrates the image based on the printing data, and FIG. 7B illustrates the image based on the inspection image data. These images have vertical stripe patterns of repeating vertical patterns and have periodicity in a horizontal direction of FIGS. 7A and 7B. That is, the image based on the printing data and the image based on the inspection image data can be said to be periodic images.

In a case of obtaining the position correction amount in order to register these images, the registration portion 32 cannot determine to which location the registration is to be performed because the images have the periodic structural feature. For example, even in a case where the block B2 set in the image based on the inspection image data is moved in the up-down direction of FIG. 7B, the difference e when the pixel values in the block B2 are compared with the pixel values in the block B1 almost does not change, and the location in which the difference e is the minimum cannot be determined. Consequently, the registration portion 32 cannot determine to which location the registration is to be performed in the up-down direction, and cannot perform the registration. In addition, even in a case where the block B2 is moved in the left-right direction of FIG. 7B, the location in which the difference e is the minimum is repeated a plurality of times because the same stripe pattern is repeated. Consequently, the registration portion 32 cannot determine to which location the registration is to be performed even in the left-right direction, and cannot perform the registration.

While the above case describes the image having the periodic structural feature, the present invention is not limited thereto. For example, the position correction amount may not be calculable even in a case of the image not having the structural feature. Examples of the image not having the structural feature include a full halftone image and a full white image.

Therefore, in the present exemplary embodiment, this problem is addressed using the following method.

Figure 8:
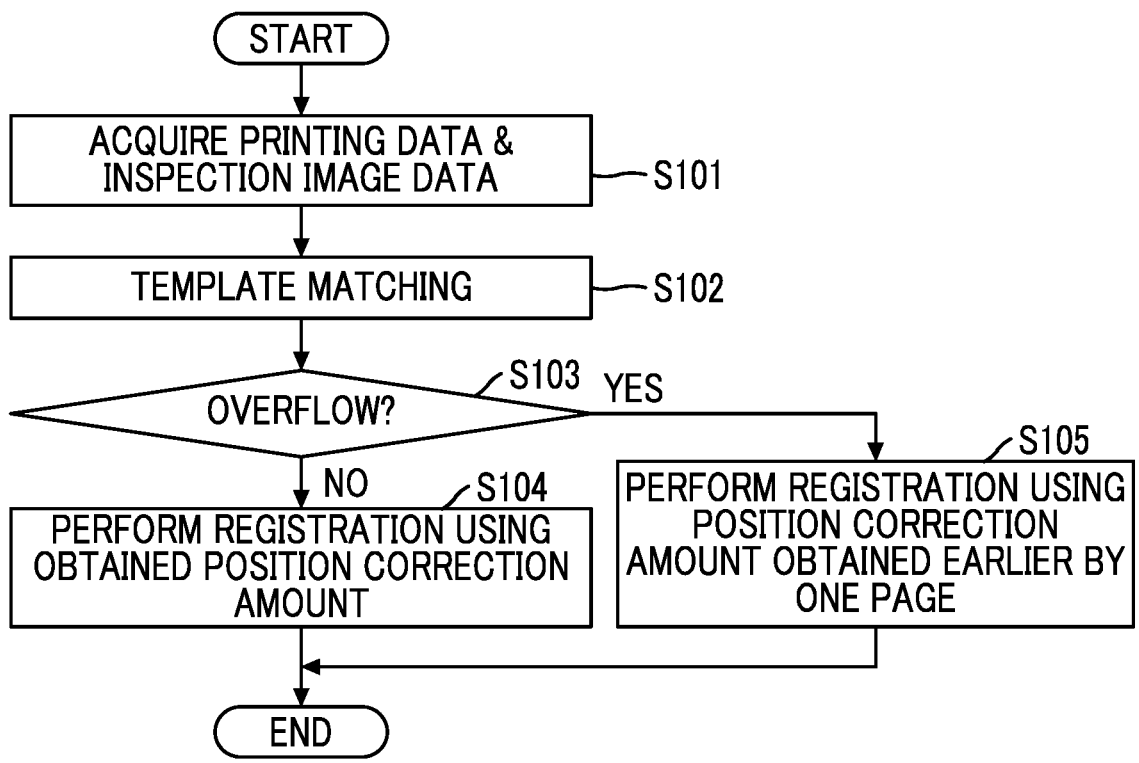
FIG. 8 is a first example illustrating a method of registration according to the present exemplary embodiment.

FIG. 8 is a first example illustrating a method of the registration according to the present exemplary embodiment.

In FIG. 8, in obtaining the position correction amount, the printing data or the inspection image data is specified as the image having the periodic structural feature or the image not having the structural feature when the position correction amount exceeds a predetermined value and overflows.

First, the registration portion 32 acquires the printing data and the inspection image data from the data acquisition portion 31 (step S101).

Next, the registration portion 32 performs the template matching (step S102).

Consequently, the registration portion 32 determines whether or not the position correction amount exceeds the predetermined value and overflows (step S103). The registration portion 32 decides, in advance, a range in which the block B1 or the block B2 is shifted in the left-right direction (main scanning direction) and the up-down direction (sub-scanning direction) of the images. For example, this range is a range in which misregistration of the images may occur at a time of performing normal printing. The position correction amount overflows in a case where the position correction amount deviates from this range. That is, since the location in which the difference e is the minimum cannot be determined, the position correction amount is not obtained within the predetermined range. In this case, since the position correction amount exceeds the predetermined range, overflow occurs. In this case, the registration portion 32 can be said to be unable to calculate the position correction amount in a case where the matching degree (for example, the difference e) does not reach the predetermined range within a predetermined range of an amount of the translation.

In a case where the overflow does not occur (No in step S103), the position correction amount is obtained. Thus, the registration is performed using the obtained position correction amount (step S104).

On the other hand, in a case where the overflow occurs (Yes in step S103), the printing data or the inspection image data is specified as the image having the periodic structural feature or the image not having the structural feature. Thus, the registration is performed using the position correction amount in the printing performed earlier by one page (step S105). That is, an amount of misregistration is rarely large between pages and normally almost does not change from the printing performed earlier by one page. Thus, in a case where the position correction amount is not obtained, the position correction amount when the printing is performed earlier by one page may be used without a problem.

Figure 9:
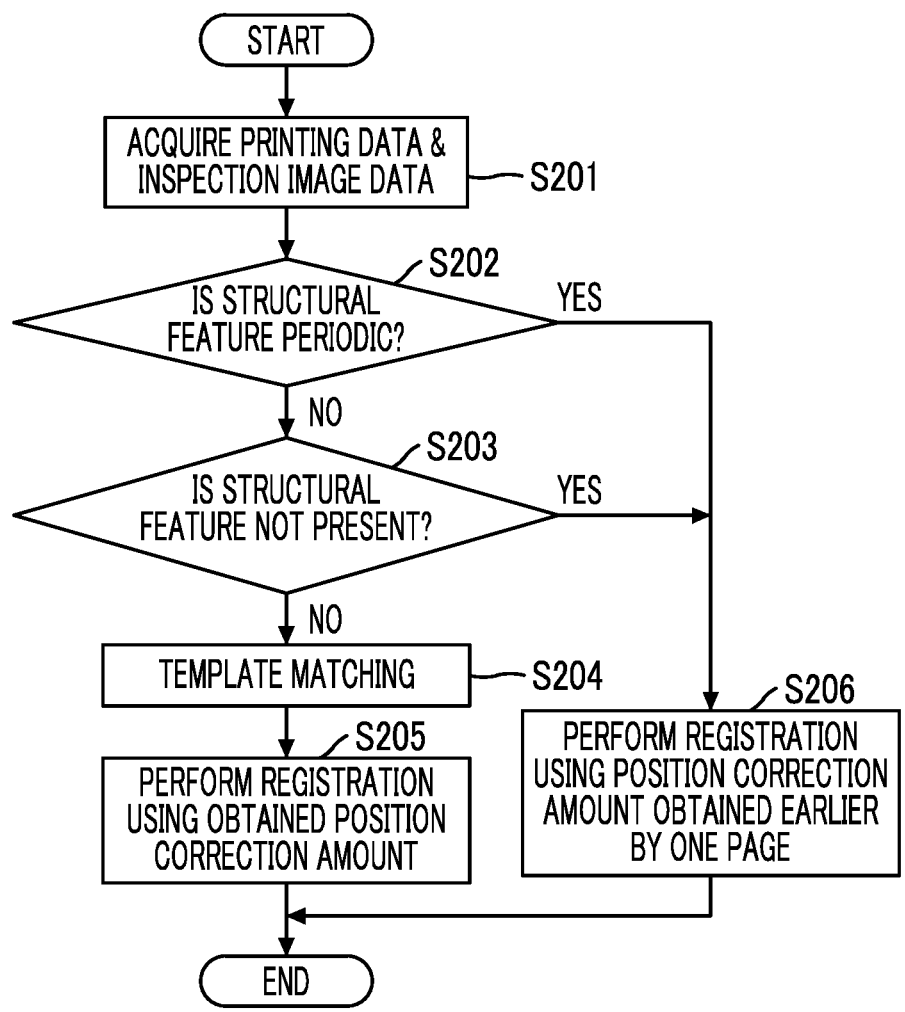
FIG. 9 is a second example illustrating the method of the registration according to the present exemplary embodiment.

FIG. 9 is a second example illustrating the method of the registration according to the present exemplary embodiment.

In FIG. 9, whether or not the printing data or the inspection image data is the image having the periodic structural feature or the image not having the structural feature is specified before the template matching.

First, the registration portion 32 acquires the printing data and the inspection image data from the data acquisition portion 31 (step S201).

Next, the registration portion 32 specifies whether or not the printing data is the image having the periodic structural feature (step S202). This specifying can be performed by determining whether or not identical pixel values occur for each predetermined number of pixels in the printing data. That is, the registration portion 32 detects whether or not identical pixel values are repeated in each of the up-down direction and the left-right direction of the image in the printing data. For example, the predetermined number of pixels is selected from two pixels, four pixels, and eight pixels. In this case, the registration portion 32 specifies the image having the periodic structural feature by sensing repetition of pixel values of the printing data. More specifically, the registration portion 32 specifies the printing data as the image having the periodic structural feature when pixel values are the same for each predetermined number of pixels in a transport direction (sub-scanning direction) of the paper sheet P and/or a direction (main scanning direction) intersecting with the transport direction in the printing data. Here, "the same" includes not only a case where the pixel values are identical but also a case where the pixel values are approximately the same and almost the same.

Consequently, in a case where the printing data is not the image having the periodic structural feature (No in step S202), whether or not the printing data is the image not having the structural feature is specified (step S203). This specifying is performed by determining whether or not pixel values fall within a predetermined range in a predetermined region in the printing data. When the pixel values fall within the predetermined range, the registration portion 32 specifies the printing data as the image not having the structural feature. That is, this case means that the same pixel value repeats, and corresponds to a case of the halftone image or the full white image.

In a case where the printing data is not the image not having the structural feature (No in step S203), that is, in a case where the printing data is the image having the structural feature, the registration portion 32 performs the template matching (step S204). The registration portion 32 performs the registration using the obtained position correction amount (step S205).

On the other hand, in a case where the printing data is the image having the periodic structural feature (Yes in step S202), and in a case where the printing data is the image not having the structural feature (Yes in step S203), the registration is performed using the position correction amount in the printing performed earlier by one page (step S206).

In actuality, as described above, the template matching is performed for each block B. Thus, the processing illustrated in FIG. 8 and FIG. 9 is performed for each block. That is, different cases may be applied for each block between a case of using the position correction amount obtained in the image of one page and a case of using the position correction amount obtained earlier by one page. In a case of using the position correction amount obtained earlier by one page, the position correction amount of the block B at the same position in the image earlier by one page is used.

In addition, while any of the processing illustrated in FIG. 8 and FIG. 9 may be performed alone, the processing illustrated in FIG. 8 and FIG. 9 can also be performed together.

Furthermore, in FIG. 8 and FIG. 9, while the position correction amount in the printing performed earlier by one page is used when the printing data is the image having the periodic structural feature or the image not having the structural feature, the present invention is not limited thereto. For example, an average of the position correction amounts of a plurality of most recent pages among already printed images may be used. In addition, at this point, a weighted average obtained by increasing a weight as the page is more recent may be used instead of a simple arithmetic average.

According to the above embodiment described in detail, in a case of inspecting the printed image by comparing the printing data as the base of the printed image with the read data obtained by reading the printed image, the registration may be performed even for the image having the periodic structural feature or the image not having the structural feature. Accordingly, the registration of the image is more accurately performed. Consequently, erroneous sensing is unlikely to occur in inspecting the image.

Description of Program

Here, processing performed by the image inspection apparatus 30 in the present exemplary embodiment described above is implemented by cooperation between software and hardware resources. That is, a CPU inside a control computer provided in the information processing apparatus 40 implements each function of the image inspection apparatus 30 by executing a program for implementing each function.

Thus, in the present exemplary embodiment, the processing performed by the image inspection apparatus 30 can be perceived as a program causing a computer to implement a function of acquiring the printing data that is data as the base of the image to be printed, a function of acquiring the inspection image data that is the read data which is data obtained by reading the image printed on the paper sheet P, a function of specifying whether or not the printing data or the inspection image data is an image corresponding to any of the image having the periodic structural feature or the image not having the structural feature, a function of performing, in a case where the printing data or the inspection image data corresponds to the image having the periodic structural feature or the image not having the structural feature, the registration using the position correction amount that is a correction amount for registering the image based on the printing data and the image based on the inspection image data and is calculated for the already printed image, and a function of inspecting the image by comparing the printing data with the read data.

The program implementing the present exemplary embodiment can be not only provided by communication means but also provided by storing the program in a recording medium such as a CD-ROM.

While the present exemplary embodiment is described above, the technical scope of the present invention is not limited to the scope disclosed in the exemplary embodiment. As is apparent from the disclosure of the claims, the above exemplary embodiment to which various modifications or improvements are carried out also falls in the technical scope of the present invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image inspection apparatus comprising:
  a processor configured to:
    acquire printing data that is data as a base of an image to be printed;
    acquire read data that is data obtained by reading the image printed on a paper sheet;
    specify whether or not the printing data or the read data is an image corresponding to any of an image having a periodic structural feature or an image not having a structural feature;
    in a case where the printing data or the read data corresponds to the image having the periodic structural feature or the image not having the structural feature, perform registration using a position correction amount that is a correction amount for registering an image based on the printing data and an image based on the read data and is calculated for an already printed image; and
    inspect the image by comparing the printing data with the read data.

2. The image inspection apparatus according to claim 1, wherein the processor is configured to:
  extract a feature amount from the printing data and/or the read data and determine that the position correction amount is not calculable using the feature amount.

3. The image inspection apparatus according to claim 2, wherein the feature amount is a matching degree when the printing data and the read data are relatively translated.

4. The image inspection apparatus according to claim 3, wherein the processor is configured to:
  in a case where the matching degree does not reach a predetermined range within a predetermined range of an amount of the translation, determine that the position correction amount is not calculable.

5. The image inspection apparatus according to claim 1, wherein the processor is configured to:
  specify the image having the periodic structural feature by sensing repetition of pixel values of the printing data.

6. The image inspection apparatus according to claim 5, wherein the processor is configured to:
  when the pixel values are the same for each predetermined number of pixels in a transport direction of the paper sheet and/or a direction intersecting with the transport direction in the printing data, specify that the printing data or the read data is the image having the periodic structural feature.

7. The image inspection apparatus according to claim 1, wherein the processor is configured to:
  when pixel values fall within a predetermined range in a predetermined region in the printing data, specify that the printing data or the read data is the image not having the structural feature.

8. The image inspection apparatus according to claim 1, wherein the already printed image is an image printed earlier by one page.

9. An image inspection system comprising:
  a printing apparatus that prints an image on a paper sheet;
  a reading apparatus that reads the image printed on the paper sheet by the printing apparatus; and
  an image inspection apparatus that inspects the image read by the reading apparatus,
  wherein the image inspection apparatus includes a processor, and
  the processor is configured to:
    acquire printing data that is data as a base of an image to be printed,
    acquire read data that is data obtained by reading the image printed on the paper sheet,
    specify whether or not the printing data or the read data is an image corresponding to any of an image having a periodic structural feature or an image not having a structural feature,
    in a case where the printing data or the read data corresponds to the image having the periodic structural feature or the image not having the structural feature, perform registration using a position correction amount that is a correction amount for registering an image based on the printing data and an image based on the read data and is calculated for an already printed image, and
    inspect the image by comparing the printing data with the read data.

10. A non-transitory computer readable medium storing a program causing a computer to implement:
  a function of acquiring printing data that is data as a base of an image to be printed;
  a function of acquiring read data that is data obtained by reading the image printed on a paper sheet;
  a function of specifying whether or not the printing data or the read data is an image corresponding to any of an image having a periodic structural feature or an image not having a structural feature;
  a function of performing, in a case where the printing data or the read data corresponds to the image having the periodic structural feature or the image not having the structural feature, registration using a position correction amount that is a correction amount for registering an image based on the printing data and an image based on the read data and is calculated for an already printed image; and a function of inspecting the image by comparing the printing data with the read data.

\* \* \* \* \*